US012614051B2

(12) United States Patent
Wang et al.

(10) Patent No.: US 12,614,051 B2
(45) Date of Patent: Apr. 28, 2026

(54) ELECTRONIC SHELF LABEL

(71) Applicant: Hanshow Technology Co., Ltd.,
Jiaxing (CN)

(72) Inventors: Yanwei Wang, Jiaxing (CN); Qingshan Shao, Jiaxing (CN); Xiang Tian, Jiaxing (CN); Zien Jiang, Jiaxing (CN)

(73) Assignee: Hanshow Technology Co., Ltd.,
Jiaxing (CN)

( * ) Notice: Subject to any disclaimer, the term of this patent is extended or adjusted under 35 U.S.C. 154(b) by 0 days.

(21) Appl. No.: 18/849,947

(22) PCT Filed: Mar. 8, 2023

(86) PCT No.: PCT/CN2023/080294
§ 371 (c)(1),
(2) Date: Sep. 23, 2024

(87) PCT Pub. No.: WO2023/179364
PCT Pub. Date: Sep. 28, 2023

(65) Prior Publication Data
US 2025/0200320 A1 Jun. 19, 2025

(30) Foreign Application Priority Data

Mar. 22, 2022 (CN) .......................... 202220625835.6

(51) Int. Cl.
*G06K 19/07* (2006.01)
(52) U.S. Cl.
CPC ..... *G06K 19/0723* (2013.01); *G06K 19/0702* (2013.01)
(58) Field of Classification Search
CPC ........................ G06K 19/0723; G06K 19/0702
USPC ........................................................ 235/492
See application file for complete search history.

(56) References Cited

U.S. PATENT DOCUMENTS

2012/0075148 A1 3/2012 Cho
2012/0235868 A1 9/2012 Oshiro et al.
(Continued)

FOREIGN PATENT DOCUMENTS

CN 102299407 A 12/2011
CN 102804488 A 11/2012
(Continued)

OTHER PUBLICATIONS

International Searching Authority, "International Search Report," issued in connection with International Application No. PCT/CN2023/080294, mailed Jun. 14, 2023, 5 pages. [English translation provided].
(Continued)

*Primary Examiner* — Ahshik Kim
(74) *Attorney, Agent, or Firm* — Hanley, Flight & Zimmerman, LLC

(57) ABSTRACT

The present disclosure discloses an electronic shelf label, including: at a position outside a PCB of the electronic shelf label, a passive NFC antenna that does not have an electrical connection with an existing NFC antenna is added, and the passive NFC antenna is coupled with the existing NFC antenna. The present disclosure improves the NFC signal strength and NFC field strength distribution both of which are near the electronic shelf label screen, in the case that the size of the electronic shelf label is limited and the NFC antenna is shielded by the screen, battery, structural parts, etc, thereby improving NFC communication distance, effective sensing area, trigger response speed and other performance of the shelf label.

9 Claims, 4 Drawing Sheets

(56) References Cited

U.S. PATENT DOCUMENTS

| | | | |
|---|---|---|---|
| 2013/0339151 A1 | 12/2013 | Bottine et al. | |
| 2015/0169907 A1* | 6/2015 | Chang ..................... | H02J 50/10 |
| | | | 340/10.6 |
| 2017/0272127 A1 | 9/2017 | Jang et al. | |
| 2022/0058460 A1* | 2/2022 | Hiscock ................. | H04B 5/263 |
| 2024/0185744 A1* | 6/2024 | Rössl ..................... | G09F 3/208 |
| 2024/0242176 A1* | 7/2024 | Schwarz ............. | G06Q 10/087 |
| 2024/0428709 A1* | 12/2024 | Rossl ..................... | G09F 3/208 |

FOREIGN PATENT DOCUMENTS

| | | | |
|---|---|---|---|
| CN | 107221738 A | 9/2017 |
| CN | 206863789 U | 1/2018 |
| CN | 218005262 U | 12/2022 |

OTHER PUBLICATIONS

International Searching Authority, "International Written Opinion," issued in connection with International Application No. PCT/CN2023/080294, mailed Jun. 14, 2023, 8 pages. [English translation provided].
China National Intellectual Property Administration, "First Notification of Office Action," issued in connection with Chinese Patent Application No. 202220625835.6, dated Jul. 6, 2022, 2 pages. [English translation provided].
European Patent Office, "Extended European Search Report," issued in connection with European Patent Application No. 23773613.7, dated Feb. 5, 2026, 9 pages.

* cited by examiner

4

5

2

ELECTRONIC SHELF LABEL

CROSS REFERENCE TO RELATED APPLICATION

The present disclosure is a National Stage of International Application No. PCT/CN2023/080294 filed on Mar. 8, 2023, which claims priority to Chinese Patent Application No. 202220625835.6, entitled "electronic shelf label", and filed on Mar. 22, 2022.

TECHNICAL FIELD

The present disclosure relates to the technical field of electronic shelf labels, and in particular to an electronic shelf label.

BACKGROUND

This portion is intended to provide background or context for embodiments of the present disclosure set forth in the claims. The description herein is not acknowledge as the prior art just because it is included in this portion.

As various types of electronic shelf labels are widely applied in supermarket retail, warehousing logistics, digital signage and other similar fields. In order to expand the function and interaction means of the electronic shelf label, NFC (Near Field Communication) communication functions have been widely integrated in the electronic shelf label. The existing electronic shelf label has only one NFC antenna, which is usually integrated on a PCB (printed circuit board) of the electronic shelf label, and has an electrical connection relationship with the NFC circuit on the PCB of the electronic shelf label, or is electrically connected to the NFC circuit on the PCB as a separate antenna attachment. However, due to being limited by the size of the electronic shelf label, the NFC antenna of the electronic shelf label is often shielded by the screen, battery, structural parts, etc., resulting in poor NFC performance near the screen of the electronic shelf label, that is, the NFC communication distance of the electronic shelf label is shortened, the effective induction area is reduced, the triggering response speed is slowed down and other similar problems, and the user experience is deteriorated.

SUMMARY

Embodiments of the present disclosure provide an electronic shelf label, including: at a position outside a PCB of the electronic shelf label, a passive NFC antenna that does not have an electrical connection relationship with an existing NFC antenna is added, in which the passive NFC antenna is a relay coupling coil, and the passive NFC antenna is coupled with the existing NFC antenna.

In an embodiment, the position outside the PCB of the electronic shelf label is on a lens of the electronic shelf label, and the passive NFC antenna is a relay coupling coil surrounding the lens of the electronic shelf label.

In an embodiment, the position outside the PCB of the electronic shelf label is on a front housing of the electronic shelf label, and the passive NFC antenna is a relay coupling coil surrounding the front housing of the electronic shelf label.

In an embodiment, the position outside the PCB of the electronic shelf label is at a battery box cover of the electronic shelf label, and the passive NFC antenna is a relay coupling coil surrounding the battery box cover.

In an embodiment, the position outside the PCB of the electronic shelf label is at a rear housing of the electronic shelf label, and the passive NFC antenna is a relay coupling coil surrounding the rear housing of the electronic shelf label.

In an embodiment, the position outside the PCB of the electronic shelf label is on a middle frame housing of the electronic shelf label, and the passive NFC antenna is a relay coupling coil surrounding the middle frame housing of the electronic shelf label.

In an embodiment, the position outside the PCB of the electronic shelf label is on an electronic shelf label housing, and the passive NFC antenna is a relay coupling coil surrounding the electronic shelf label housing.

In an embodiment, the electronic shelf label further includes an antenna matching component which is connected in series or parallel to the passive NFC antenna, to improve characteristic parameters of the passive NFC antenna.

In an embodiment, the passive NFC antenna is affixed to or embedded at the position outside the PCB of the electronic shelf label.

In the embodiment of the present disclosure, compared with the technical solution of the prior art in which the electronic shelf label has only one NFC antenna, due to the limited size of the electronic shelf label itself, the screen, battery, and other metal accessories may shield the NFC antenna of the electronic shelf label, resulting in attenuation of the NFC signal on the front and around of the shelf label screen, resulting in NFC performance degradation, in the present disclosure, at a position beside the PCB of the electronic shelf label, a passive NFC antenna that does not have an electrical connection relationship with the existing NFC antenna is added, and the passive NFC antenna is coupled with the existing NFC antenna, which can improve the NFC signal strength and NFC field strength distribution both of which are near the electronic shelf label screen, thereby improving the NFC communication distance, effective sensing area, trigger response speed and other performance of the shelf label.

BRIEF DESCRIPTION OF THE DRAWINGS

In order to illustrate the technical solutions in the embodiments of the present disclosure more clearly, the drawings to be used in the description of the embodiments will be briefly introduced below. Obviously, the drawings involved in the following description illustrate only some embodiments of the present disclosure, and those of ordinary skill in the art may obtain other drawings from these drawings without paying any inventive effort. In the drawings.

DESCRIPTION OF THE EMBODIMENTS

In order to more clearly illustrate the purpose, technical solution and advantages according to embodiments of the present disclosure, hereinafter the embodiments of the present disclosure will be further described in detail in combination with the drawings. Here in the text, the schematic embodiments of the present disclosure and the description thereof are used for explaining the present disclosure and do not constitute definition to the present disclosure.

Based on the problems existing in the prior art, the present disclosure provides an electronic shelf label, as shown in FIGS. 1 to 4, the electronic shelf label including: at a position outside a PCB (5) of the electronic shelf label (the position indicated by the arrow is an installation position of the passive NFC antenna), a passive NFC antenna (1, 2, 3) that does not have an electrical connection relationship with an existing NFC antenna (4) is added, and the passive NFC antenna (1, 2, 3) is coupled with the existing NFC antenna (4).

Specifically, at the position outside a PCB (5) of the shelf label, a passive NFC antenna (1, 2, 3) that does not have an electrical connection relationship with the existing NFC antenna (4), the circuit or the like is added. For the alternating signals in the antenna, the signal strength and field strength distribution of the NFC signal field strength near the electronic shelf label screen are improved by coupling the passive NFC antenna (1, 2, 3) with the existing NFC antenna (4), thereby improving the NFC communication distance, effective sensing area, trigger response speed and other performance of the shelf label.

Figure 1:
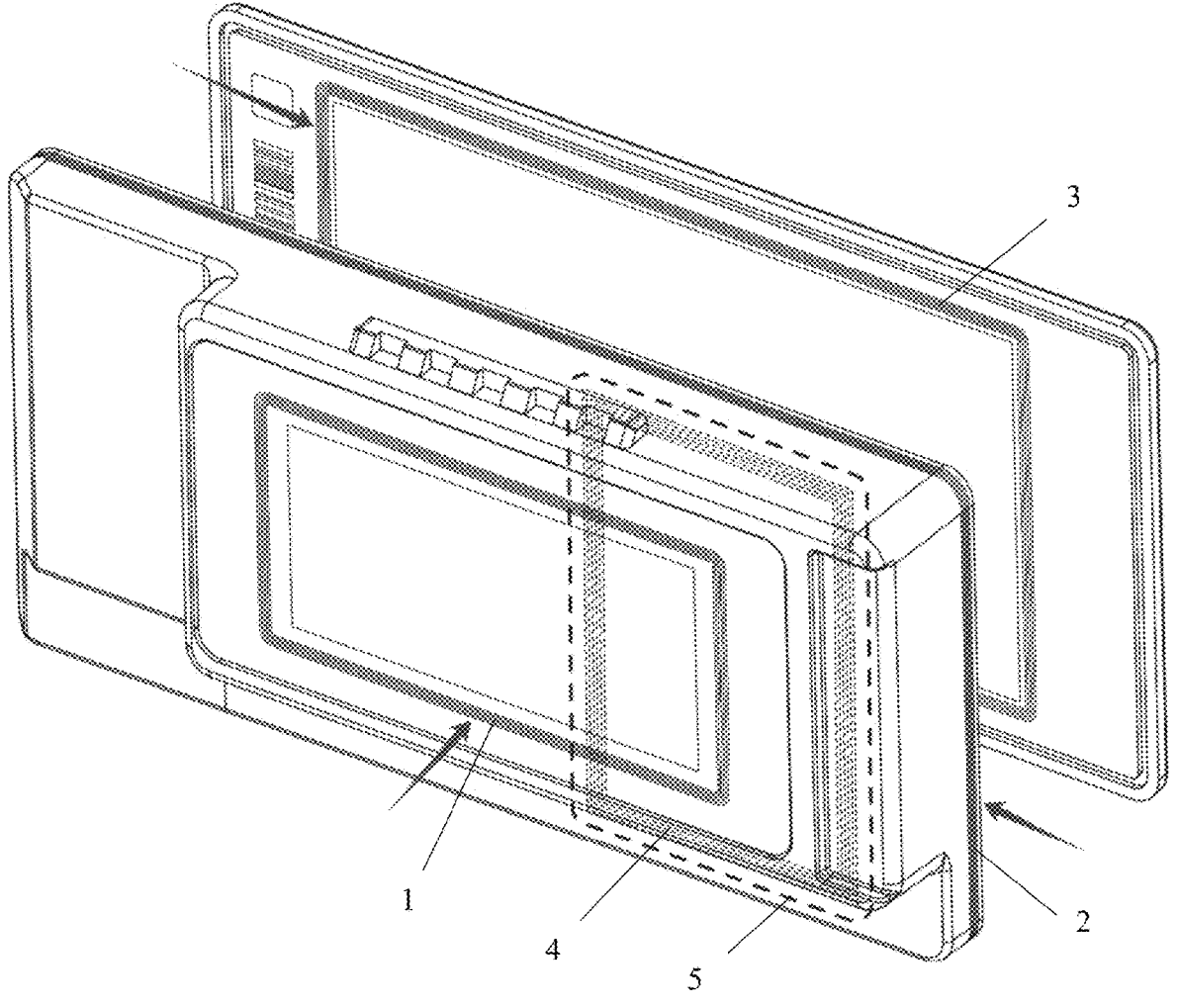
FIG. 1 is a structural schematic diagram of an electronic shelf label according to an embodiment of the present disclosure.

FIG. 1 shows totally three schemes of installation position of the passive NFC antenna (1, 2, 3), but the positions of the NFC passive relay coupling coil of the electronic shelf label include but are not limited to the above three schemes. FIG. 1 shows a complete electronic shelf label structure, which is a structural part that is formed by assembling a lens in front (the portion depicted at the rear in FIG. 1) and a middle frame housing and a battery box in rear (the portion depicted at the front in FIG. 1) together.

Specifically, coupling refers to the process in which energy is transmitted from one medium (e.g., a metal wire, an optical fiber) to another medium. In electronics, coupling refers to the transfer of energy from one circuit part to another circuit part.

Figure 2:
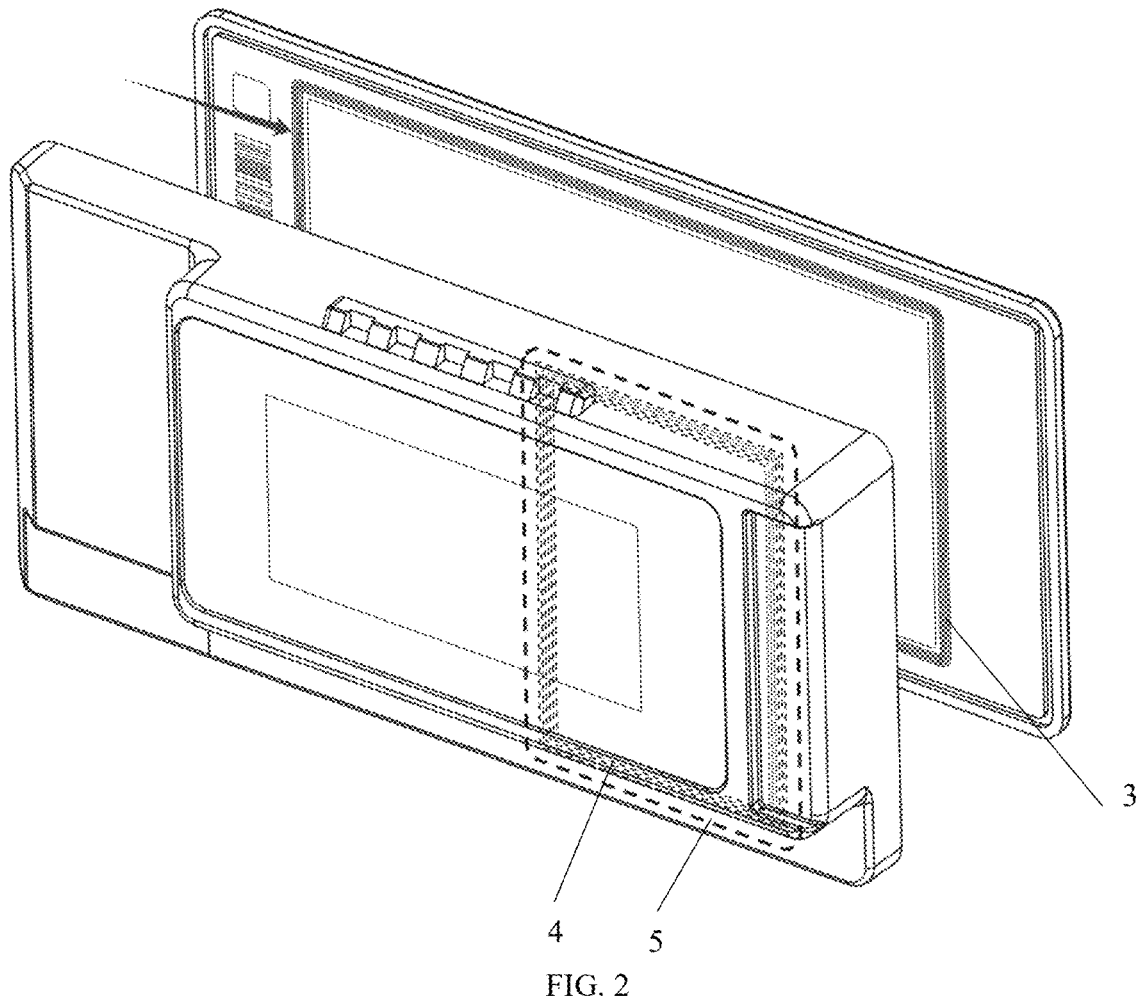
FIG. 2 is a structural schematic diagram of the passive NFC relay coupling antenna on the lens or the front housing of the electronic shelf label according to an embodiment of the present disclosure.

In the embodiment of the present disclosure, FIG. 2 is the reference scheme 1 in which the shelf label is supplemented with a passive NFC antenna (3). As shown in FIGS. 1 and 2, the position outside a PCB (5) of the electronic shelf label is on a lens of the electronic shelf label, and the passive NFC antenna (3) is a relay coupling coil surrounding the lens of the electronic shelf label.

Alternatively, as shown in FIGS. 1 and 2, the position outside the PCB (5) of the electronic shelf label is on a front housing of the electronic shelf label, and the passive NFC antenna (3) is a relay coupling coil surrounding the front housing of the electronic shelf label.

Specifically, the front end of the screen of the electronic shelf label usually includes two types of with a lens and without a lens. For an electronic shelf label with a lens, the passive NFC antenna (3) is capable of being provided around the electronic shelf label lens. For an electronic shelf label without a lens, there is an injection-molded structural part similar to a lens frame, often called as a front housing, and the passive NFC antenna (3) is capable of being provided around the front housing.

Figure 3:
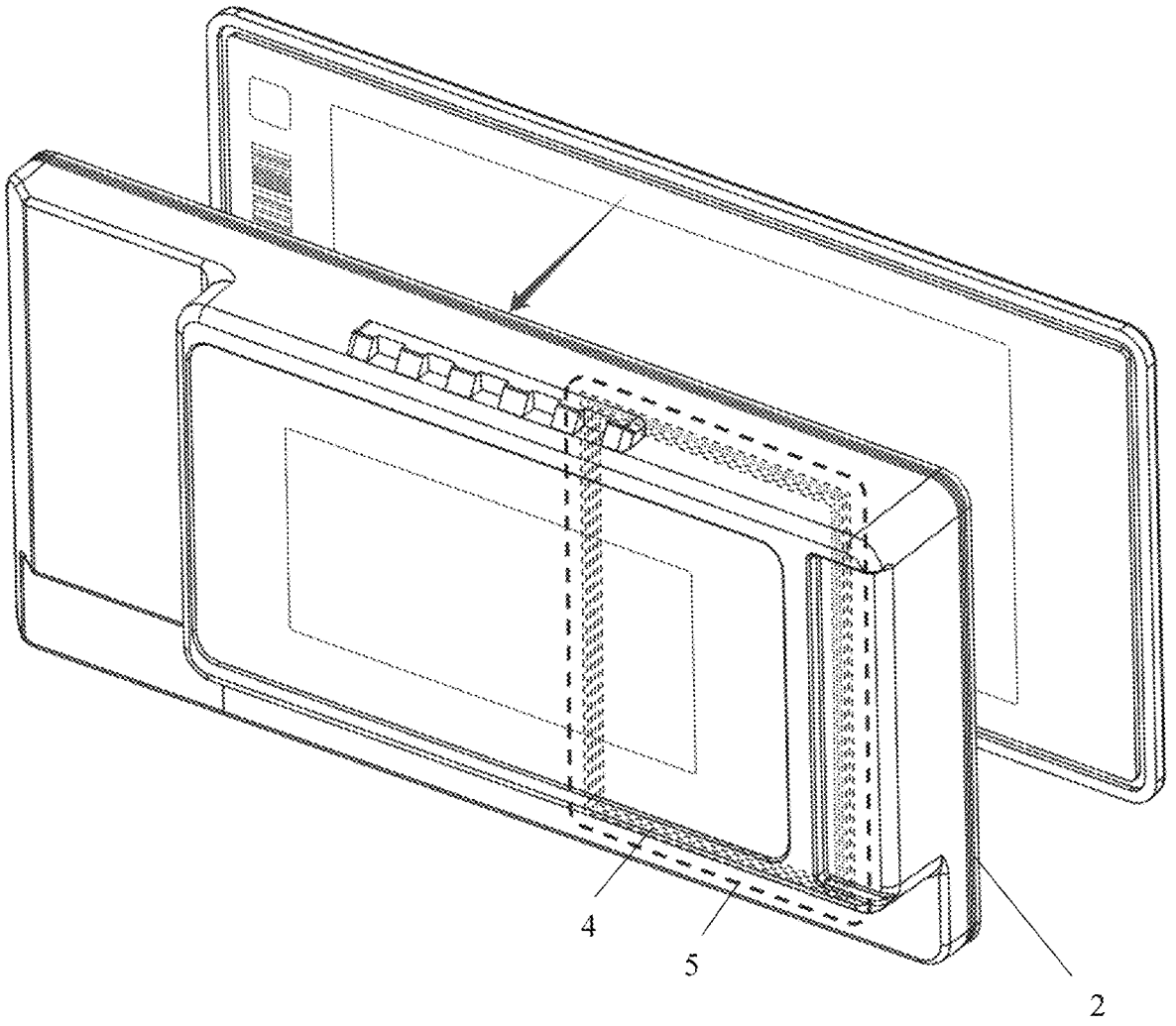
FIG. 3 is a structural schematic diagram of the passive NFC relay coupling antenna on the housing or the middle frame housing of the electronic shelf label according to an embodiment of the present disclosure.

In the embodiment of the present disclosure, FIG. 3 is the reference scheme 2 in which the shelf label is supplemented with a passive NFC antenna (2). As shown in FIGS. 1 and 3, the position outside the PCB (5) of the electronic shelf label is on a middle frame housing of the electronic shelf label, and the passive NFC antenna (2) is a relay coupling coil surrounding the middle frame housing of the electronic shelf label.

Alternatively, as shown in FIGS. 1 and 3, the position outside the PCB (5) of the electronic shelf label is on an electronic shelf label housing, and the passive NFC antenna (2) is a relay coupling coil surrounding the electronic shelf label housing.

Specifically, the electronic shelf label housing is the structural part where the passive NFC antenna coil is located as indicated by the three arrows in FIG. 1, which includes the battery box, the middle frame, the lens, etc., and the collection of these components is referred to as the electronic shelf label housing.

The middle frame of the shelf label refers to the housing structural part where the passive NFC antenna coil is located as indicated by the middle arrow in the FIG. 1.

Figure 4:
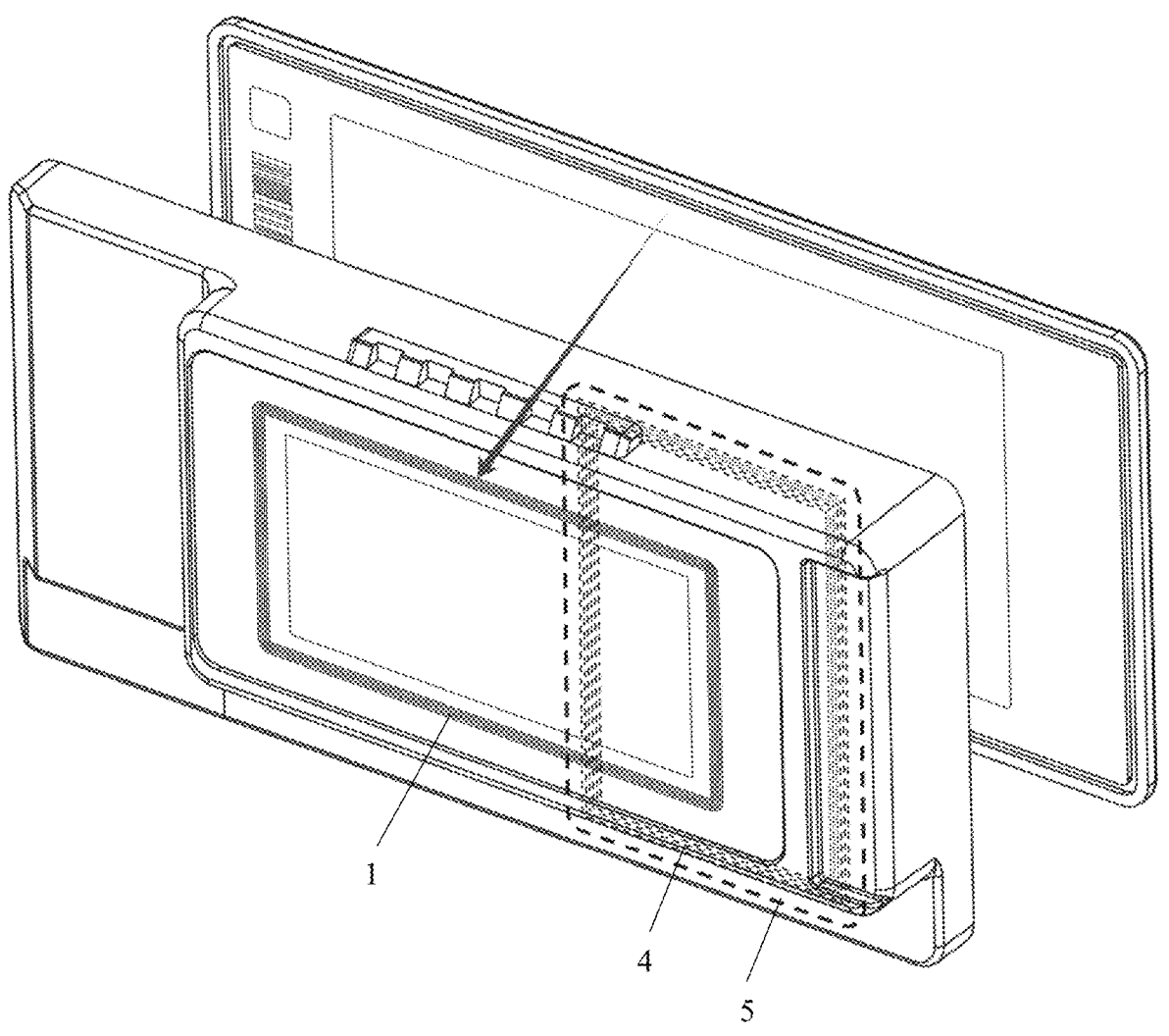
FIG. 4 is a structural schematic diagram of the passive NFC relay coupling antenna on the battery box housing or the rear housing according to an embodiment of the present disclosure.

In the embodiment of the present disclosure, FIG. 4 is the reference scheme 3 in which the shelf label is supplemented with a passive NFC antenna (1). As shown in FIGS. 1 and 4, the position outside the PCB (5) of the electronic shelf label is at a battery box cover (a housing of a battery box) of the electronic shelf label, and the passive NFC antenna (1) is a relay coupling coil surrounding the battery box cover.

Alternatively, as shown in FIGS. 1 and 4, the position outside the PCB (5) of the electronic shelf label is at a rear housing of the electronic shelf label, and the passive NFC antenna (1) is a relay coupling coil surrounding the rear housing of the electronic shelf label.

Specifically, the electronic shelf label currently has two forms of battery replaceable and battery non-replaceable: 1. the electronic shelf label with battery replaceable, usually has a battery box structure; 2. as for the electronic shelf label with battery non-replaceable, usually, the middle frame housing and the battery box are integrated, that is, the appearance structural part of the shelf label visible to the human eye has only two structural parts, the lens and the housing, and the housing is often called the rear housing.

In the embodiment of the present disclosure, the electronic shelf label further includes an antenna matching component (not marked in FIG. 1) which is connected in series or parallel to the passive NFC antenna (1, 2, 3) (i.e. the relay coupling coil), to improve the Q-value (quality factor), center frequency, pass band-width of frequency and other characteristic parameters of the passive NFC antenna (1, 2, 3).

Specifically, the antenna matching component is usually an inductor component or a capacitor component to which the NFC antenna coil is connected in series or parallel.

In the embodiment of the present disclosure, the passive NFC antenna (1, 2, 3) may be affixed to or embedded at the position outside the PCB (5) of the electronic shelf label.

To sum up the above, in the embodiment of the present disclosure, compared with the technical solution of the prior art in which the electronic shelf label has only one NFC antenna, due to the limited size of the electronic shelf label itself, the screen, battery, and other metal accessories may shield the NFC antenna of the electronic shelf label, resulting in attenuation of the NFC signal on the front and around of the shelf label screen, resulting in NFC performance degradation, in the present disclosure, at a position beside the PCB (5) of the electronic shelf label, a passive NFC antenna (1, 2, 3) that does not have an electrical connection with the existing NFC antenna (4) is added, and the passive NFC antenna (1, 2, 3) is coupled with the existing NFC antenna (4), which can improve the NFC signal strength and NFC field strength distribution both of which are near the electronic shelf label screen, thereby improving the NFC communication distance, effective sensing area, trigger response speed and other performance of the shelf label.

The purpose, technical solution and beneficial effect of the present disclosure have been further described in detail in the above specific embodiments, it should be understood that the above contents are merely specific embodiments of the present disclosure and are not for limiting protection scope of the present disclosure, and any modifications, equivalent replacements, improvements and the like within the spirit and principle of the present disclosure shall be included within the protection scope of the present disclosure.

What is claimed is:

1. An electronic shelf label, comprising: at a position outside a PCB of the electronic shelf label, a passive NFC antenna that does not have an electrical wire connection with an existing NFC antenna is added, wherein the passive NFC antenna is a relay coupling coil, and the passive NFC antenna is coupled with the existing NFC antenna.

2. The electronic shelf label according to claim 1, wherein the position outside the PCB of the electronic shelf label is on a lens of the electronic shelf label, and the passive NFC antenna is a relay coupling coil surrounding the lens of the electronic shelf label.

3. The electronic shelf label according to claim 1, wherein the position outside the PCB of the electronic shelf label is on a front housing of the electronic shelf label, and the passive NFC antenna is a relay coupling coil surrounding the front housing of the electronic shelf label.

4. The electronic shelf label according to claim 1, wherein the position outside the PCB of the electronic shelf label is at a battery box cover of the electronic shelf label, and the passive NFC antenna is a relay coupling coil surrounding the battery box cover.

5. The electronic shelf label according to claim 1, wherein the position outside the PCB of the electronic shelf label is at a rear housing of the electronic shelf label, and the passive NFC antenna is a relay coupling coil surrounding the rear housing of the electronic shelf label.

6. The electronic shelf label according to claim 1, wherein the position outside the PCB of the electronic shelf label is on a middle frame housing of the electronic shelf label, and the passive NFC antenna is a relay coupling coil surrounding the middle frame housing of the electronic shelf label.

7. The electronic shelf label according to claim 1, wherein the position outside the PCB of the electronic shelf label is on an electronic shelf label housing, and the passive NFC antenna is a relay coupling coil surrounding the electronic shelf label housing.

8. The electronic shelf label according to claim 1, further comprising an antenna matching component which is connected in series or parallel to the passive NFC antenna, to improve characteristic parameters of the passive NFC antenna.

9. The electronic shelf label according to claim 1, wherein the passive NFC antenna is affixed to or embedded at the position outside the PCB of the electronic shelf label.

* * * * *